(12) United States Patent
Hawk et al.

(10) Patent No.: US 6,238,556 B1
(45) Date of Patent: May 29, 2001

(54) FILTRATION SYSTEM INCLUDING A BACK WASHABLE PRE-FILTRATION APPARATUS

(75) Inventors: William D. Hawk, Oklahoma City; Gary D. Cryer, Chandler, both of OK (US)

(73) Assignee: Fluid Art Technologies, LLC, Oklahoma City, OK (US)

( * ) Notice: Subject to any disclaimer, the term of this patent is extended or adjusted under 35 U.S.C. 154(b) by 0 days.

(21) Appl. No.: 09/411,733

(22) Filed: Oct. 1, 1999

(51) Int. Cl.$^7$ ............................. C02F 3/00; B01D 24/16; B01D 24/42; B01D 24/36
(52) U.S. Cl. ..................... 210/169; 210/275; 210/277; 210/266; 210/202; 210/278; 210/284; 210/287; 210/290; 210/416.2
(58) Field of Search ...................................... 210/169, 275, 210/277, 278, 284, 290, 287, 416.2, 266, 202

(56) References Cited

U.S. PATENT DOCUMENTS

| | | |
|---|---|---|
| 1,541,921 | 6/1925 | Caps . |
| 1,640,249 | 8/1927 | Perry . |
| 1,737,202 | 11/1929 | Runnels . |
| 2,466,662 | 4/1949 | Mindler . |

(List continued on next page.)

FOREIGN PATENT DOCUMENTS

| | | |
|---|---|---|
| 1305399 | * 1/1973 | (GB) . |
| 2124921 | * 2/1984 | (GB) . |

OTHER PUBLICATIONS purex triton Swimming Pool Systems; "DE Filters"; pp. 9 and 84.

(List continued on next page.)

*Primary Examiner*—Thomas M. Lithgow
(74) *Attorney, Agent, or Firm*—Dunlap, Codding & Rogers, P.C.

(57) ABSTRACT

A filtration system for filtering particulate matter from a liquid, the filtration system comprises a pre-filtration apparatus and a main filtration apparatus. The pre-filtration apparatus comprises a vessel having a fluid inlet, a fluid outlet, and a back-washing outlet, and a filtering medium disposed in the vessel and capable of filtering large particulate matter from the liquid and passing fine particulate matter. The fluid inlet and the fluid outlet are positioned such that liquid flowing therebetween is passed through the filtering medium. The fluid outlet and back-washing outlet are positioned such that liquid flowing therebetween is passed through the filtering medium. The main filtration apparatus comprises a vessel having a fluid inlet, a fluid outlet, and a filtering medium disposed in the vessel and capable of filtering fine particulate matter from the liquid. The fluid inlet and the fluid outlet are positioned such that liquid flowing therebetween is passed through the filtering medium. A pump is fluidly connected between the pre-filtration apparatus and the main filtration apparatus. The pump has a suction side and a discharge side. A pre-filter control assembly is fluidly connected between the pre-filtration apparatus and the pump. The pre-filter control assembly has a normal operation setting wherein the fluid outlet of the pre-filtration apparatus is fluidly connected to the suction side of the pump to draw liquid sequentially through the fluid inlet of the pre-filtration apparatus, and the filtering medium of the pre-filtration apparatus. The pre-filter control assembly is also provided with a back wash operation setting wherein the fluid outlet of the pre-filtration apparatus is fluidly connected to the discharge side of the pump to force liquid sequentially through the fluid outlet of the pre-filtration apparatus, the filtering medium of the pre-filtration apparatus, and the fluid outlet of the pre-filtration apparatus.

10 Claims, 6 Drawing Sheets

U.S. PATENT DOCUMENTS

| | | | |
|---|---|---|---|
| 2,467,433 | | 4/1949 | King . |
| 2,572,082 | | 10/1951 | Welsh . |
| 3,260,366 | | 7/1966 | Duff et al. . |
| 3,384,240 | | 5/1968 | Berardi . |
| 3,424,674 | | 1/1969 | Webber . |
| 3,471,025 | | 10/1969 | Dobson . |
| 3,480,542 | | 11/1969 | Bucksteeg et al. . |
| 3,616,915 | | 11/1971 | Whitlock . |
| 3,812,969 | | 5/1974 | Maroney . |
| 3,814,245 | | 6/1974 | Hirs . |
| 3,814,247 | | 6/1974 | Hirs . |
| 3,954,621 | | 5/1976 | Etani et al. . |
| 3,956,128 | | 5/1976 | Turner . |
| 4,155,850 | * | 5/1979 | Rathbone et al. . |
| 4,246,119 | | 1/1981 | Alldredge . |
| 4,309,292 | | 1/1982 | Stannard et al. . |
| 4,322,296 | | 3/1982 | Fan et al. . |
| 4,379,050 | * | 4/1983 | Hess et al. . |
| 4,519,917 | | 5/1985 | Martinola . |
| 4,547,286 | | 10/1985 | Hsiung ................................ 210/738 |
| 4,627,118 | | 12/1986 | Baker . |
| 4,780,219 | * | 10/1988 | Witek . |
| 4,806,236 | | 2/1989 | McCormack . |
| 4,885,083 | * | 12/1989 | Banks . |
| 5,114,595 | * | 5/1992 | Hensley . |
| 5,198,124 | | 3/1993 | Kim et al. ............................ 210/792 |
| 5,330,640 | | 7/1994 | Fife et al. . |
| 5,453,183 | | 9/1995 | Hoffa . |
| 5,516,434 | | 5/1996 | Cairo, Jr. et al. . |
| 5,573,349 | | 11/1996 | Paoluccio . |
| 5,723,043 | * | 3/1998 | Hawk et al. . |
| 5,932,092 | * | 8/1999 | Hawk et al. . |

OTHER PUBLICATIONS purex triton Swimming Pool Systems; "Sand Filters"; p. 4 and p. 6.

purex triton Swimming Pool Systems; "Sand Filters"; Valves, Kits and Accessories for Side Mounted Sand Filters.

* cited by examiner

FILTRATION SYSTEM INCLUDING A BACK WASHABLE PRE-FILTRATION APPARATUS

CROSS REFERENCE TO RELATED APPLICATIONS

Not applicable.

STATEMENT REGARDING FEDERALLY SPONSORED RESEARCH AND DEVELOPMENT

Not applicable.

BACKGROUND OF THE INVENTION

Many types of fluidized beds are known in the art. For example, U.S. Pat. No. 4,322,296 discloses a method for waste water treatment in a vessel having a fixed perforated plate and a movable perforated plate. A particulate carrier having a specific gravity greater than water is employed as the filtering medium within the vessel.

As a further example, U.S. Pat. No. 5,453,183 discloses a fluidized bed biological filter system for fish tanks. This system utilizes glass beads having a specific gravity greater than 1.5 times that of water as particulate media.

In these filtration systems, contaminated water is passed through a negatively buoyant particulate medium. Thus, these systems only accomplish one type of filtration, i.e., filtration through a particulate carrier having a specific gravity greater than water.

SUMMARY OF THE INVENTION

The present invention is a filtration system for filtering particulate matter from a liquid. The filtration system comprises a pre-filtration apparatus and a main filtration apparatus. The pre-filtration apparatus comprises a vessel having a fluid inlet, a fluid outlet, and a back-washing outlet, and a filtering medium disposed in the vessel and capable of filtering large particulate matter from the liquid and passing fine particulate matter.

The fluid inlet and the fluid outlet are positioned such that liquid flowing therebetween is passed through the filtering medium. The fluid outlet and back-washing outlet are positioned such that liquid flowing therebetween is passed through the filtering medium.

The main filtration apparatus comprises a vessel having a fluid inlet, a fluid outlet, and a filtering medium disposed in the vessel and capable of filtering fine particulate matter from the liquid. The fluid inlet and the fluid outlet are positioned such that liquid flowing therebetween is passed through the filtering medium.

A pump is fluidly connected between the pre-filtration apparatus and the main filtration apparatus. The pump has a suction side and a discharge side.

A pre-filter control assembly is fluidly connected between the pre-filtration apparatus and the pump. The pre-filter control assembly has a normal operation setting wherein the fluid outlet of the pre-filtration apparatus is fluidly connected to the suction side of the pump to draw liquid sequentially through the fluid inlet of the pre-filtration apparatus, and the filtering medium of the pre-filtration apparatus. The pre-filter control assembly is also provided with a back wash operation setting wherein the fluid outlet of the pre-filtration apparatus is fluidly connected to the discharge side of the pump to force liquid sequentially through the fluid outlet of the pre-filtration apparatus, the filtering medium of the pre-filtration apparatus, and the fluid outlet of the pre-filtration apparatus. Thus, the pre-filtration apparatus functions as a vacuum container during normal operation and as a pressurized container during back wash.

In one aspect of the present invention, the fluid outlet of the pre-filtration apparatus is offset laterally from a centrally disposed elongated axis of the vessel of the pre-filtration apparatus. The lateral offset of the fluid outlet causes a turbulent vortex to form in the pre-filtration apparatus during back washing to more effectively scour and remove the accumulated particulate matter from the filtering medium.

Other advantages and features of the present invention will become apparent to those of ordinary skill in the art when the following detailed description is read in conjunction with the appended claims and the attached drawings.

DETAILED DESCRIPTION OF THE INVENTION

Figure 1:
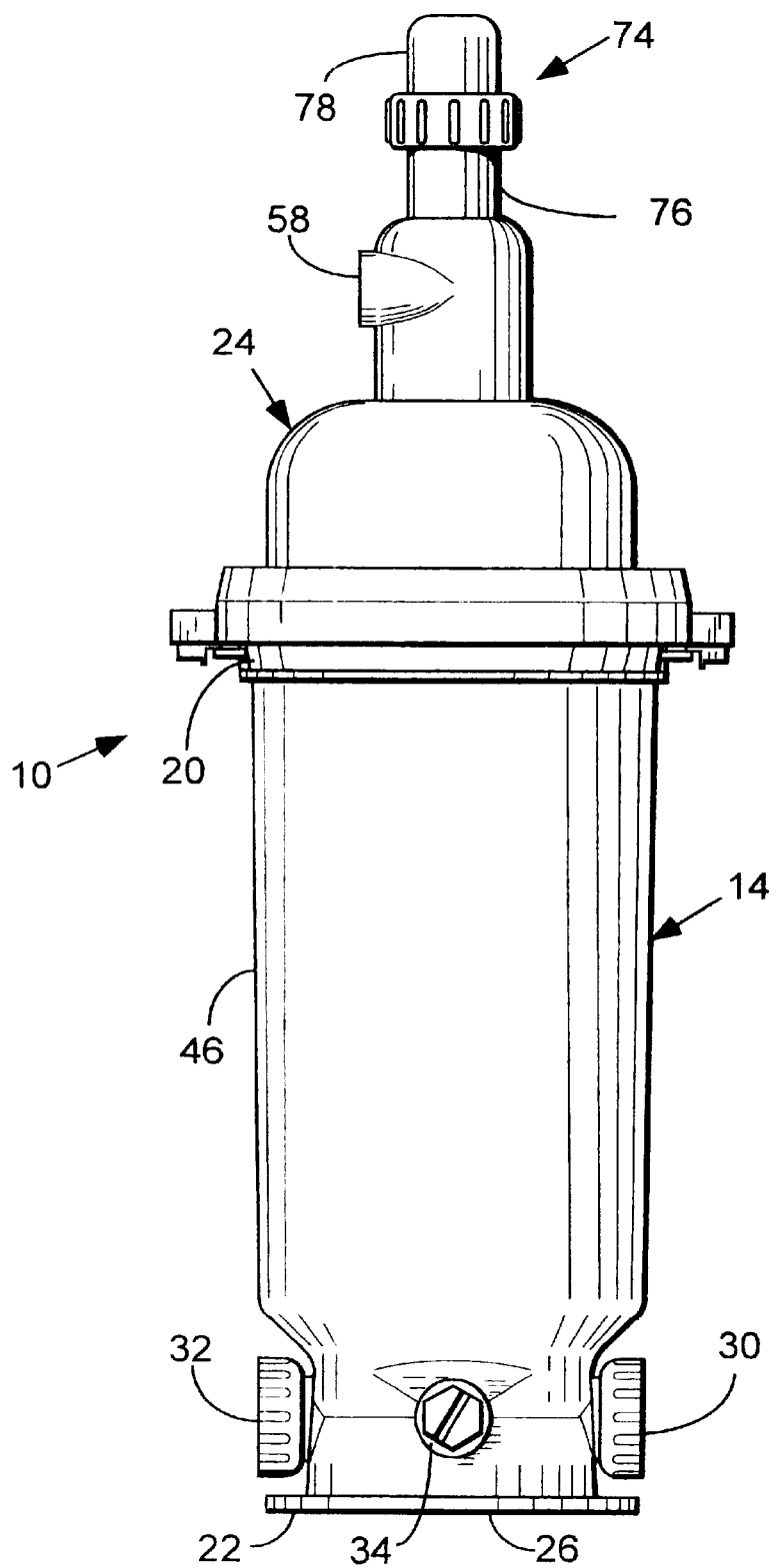
FIG. 1 is a front elevational representation of a pre-filtration apparatus constructed in accordance with the present invention.
Figure 4:
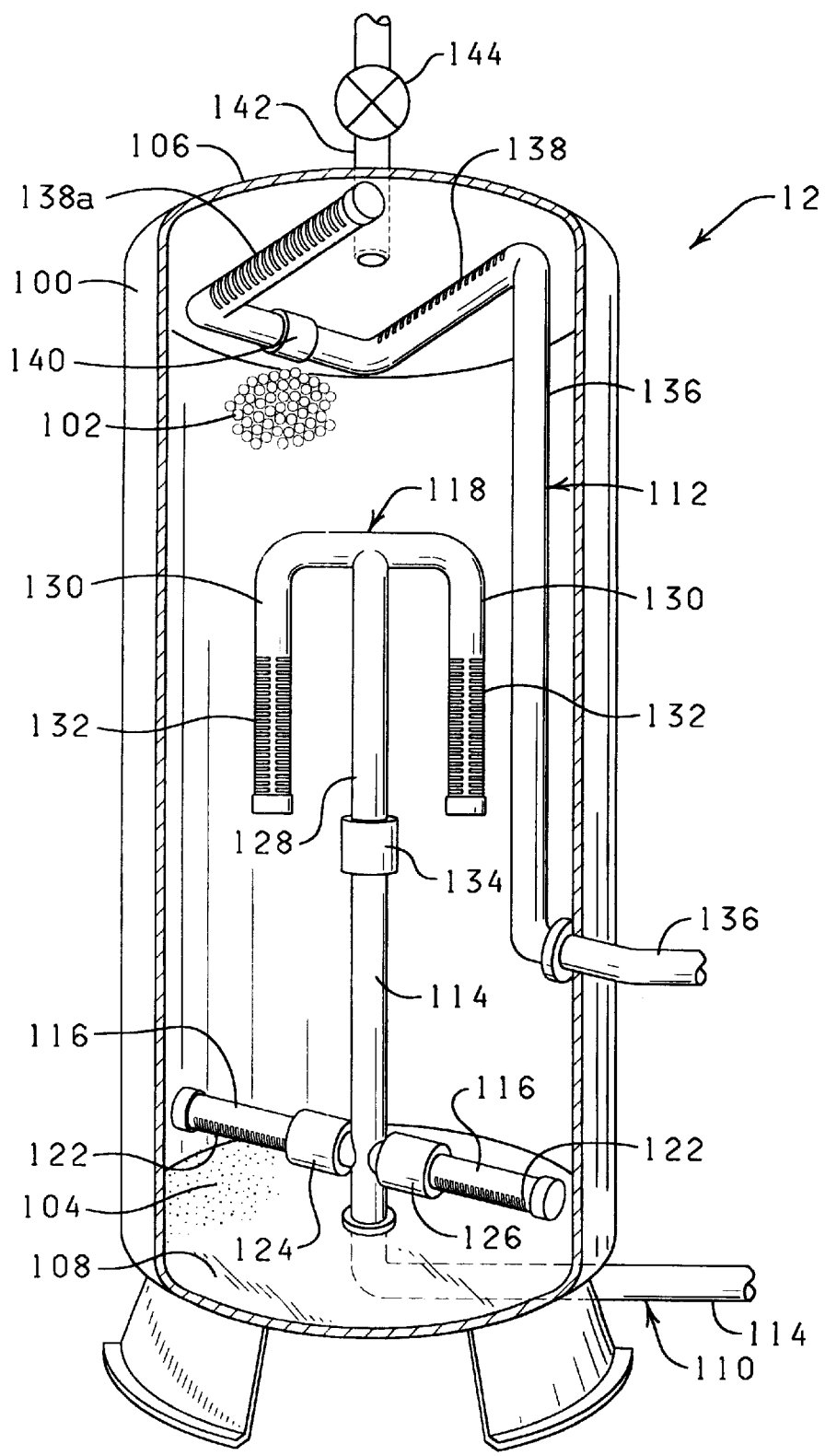
FIG. 4 is a partially diagrammatical representation of a main filtration apparatus constructed in accordance with the present invention.

Referring now to the drawings, and in particular to FIG. 1, shown therein and designated by the reference numeral 10 is a pre-filtration apparatus constructed in accordance with the present invention which functions as a vacuum container during normal operation and as a pressurized container during back wash. The pre-filter apparatus 10 is thus capable of pre-filtering contaminated liquid before such contaminated liquid is transferred to a main filtration apparatus 12 (FIG. 4). In general, (see FIGS. 5–7) contaminated liquid, such as water from a decorative pond, pool, fish tank or the like, is directed sequentially through the pre-filtration apparatus 10, which pre-filters out large particular matter such as pine needles, bird droppings, and leaves from the contaminated liquid, and the main filtration apparatus 12, which filters out the smaller particulate matter, such as dirt. However, when the pre-filtration apparatus 10 is being back washed to remove particulate material entrapped in the pre-filtration apparatus 10, the pre-filtration apparatus 10 functions as a pressurized container.

Construction of the Pre-Filtration Apparatus 10

Figure 2:
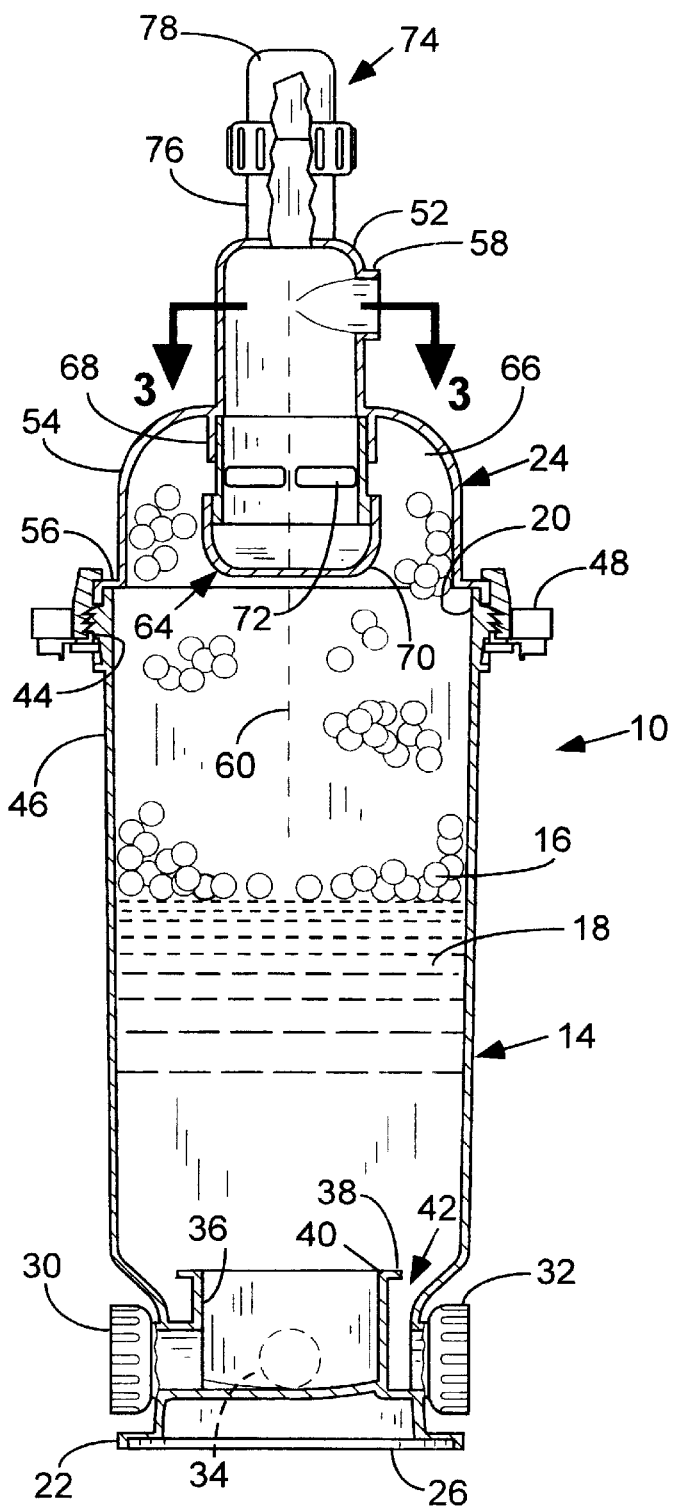
FIG. 2 is a back cross-sectional representation of the pre-filtration apparatus depicted in FIG. 1.

The pre-filtration apparatus 10 includes a vessel 14 and a filtering medium, such as a bed of positively buoyant particulate 16 (FIG. 2). Only isolated portions of the bed of positively buoyant particulate 16 is shown in FIG. 2 for purposes of clarity. The bed of positively buoyant particulate 16 is disposed in the vessel 14 and suspended in a liquid 18. The contaminated liquid is passed through the bed of positively buoyant particulate 16 so as to strain or filter out the large particulate matter, i.e. pine needles, leaves, grass and the like, in the contaminated liquid. Typically, the quantity of positively buoyant particulate 16 is adequate to provide the filtering medium extending in the upper thirty to fifty percent of the vessel 14. However, the amount of positively buoyant particulate 16 used may be increased or decreased depending on the type of liquid being filtered and the desired filtering results.

The dimensions and quantities of positively buoyant particulate 16 affect the filtering efficiency and the throughput of the pre-filtration apparatus 10. In general, small volumes of coarse particulate result in greater throughput but with fewer impurities removed from the contaminated liquid. Conversely, large quantities of fine particulate produce better filtration but reduced throughput or increased pumping requirements to pull the contaminated liquid through the pre-filtration apparatus 10. Thus, the sizes and quantities of positively buoyant particulate 16 should be selected according to the filtration characteristics desired.

The vessel 14 has a medial portion 20 and a lower end 22. The medial portion 20 supports a cap assembly 24 of the vessel 14 in a fluid tight relationship therewith. Due to its buoyancy, the bed of positively buoyant particulate 16 is amassed in the medial portion 20 and the cap assembly 24 of the vessel 14. The lower end 22 of the vessel 14 forms a stand 26 for supporting the pre-filtration apparatus 10.

A fluid inlet 30 is formed through the lower end 22 of the vessel 14 such that liquid can pass through the fluid inlet 30 and into the vessel 14 during a normal mode of operation of the pre-filtration apparatus 10. A back washing outlet 32 is formed through the lower end 22 of the vessel 14 such that liquid and the large particulate matter previously accumulated in the bed of positively buoyant particulate 16 can pass out of the vessel 14 through the back washing outlet 32 during a back washing mode of operation of the pre-filtration apparatus 10. A drain outlet 34 is also formed through the lower end 22 of the vessel 14 so that liquid can be drained out of the vessel 14, if desired.

An inner tube 36 is supported in the lower end 22 of the vessel 14 so as to channel liquid passing through the fluid inlet 30 upwardly towards the bed of positively buoyant particulate 16 during the normal mode of operation of the pre-filtration apparatus 10. To channel liquid to the back washing outlet 32, while preventing discharge of the positively buoyant particulate 16 during the back washing mode of operation of the pre-filtration apparatus 10, an annular lip 38 extends outwardly from an upper end 40 of the inner tube 36 so as to form an annular fluid discharge passageway 42 in fluid communication with the vessel 14, and also in fluid communication with the back washing outlet 32. The annular lip 38 is sized so that the positively buoyant particulate 16 cannot pass through the annular fluid discharge passageway 42 during the back washing mode of operation.

A plurality of external threads 44 are formed on an exterior surface 46 of the vessel 14, generally near the medial portion 20 thereof. The external threads 44 threadingly receive an external collar 48 for maintaining the cap assembly 24 in the fluid tight relationship with the medial portion 20 of the vessel 14.

The cap assembly 24 of the vessel 14 includes an upper portion 52 and a lower portion 54. An outwardly extending shoulder 56 is formed on the lower portion 54 for mating engagement with the medial portion 20 of the vessel 14. A portion of the external collar 48 extends over the shoulder 56 for securely maintaining the cap assembly 24 on the medial portion 20 of the vessel 14.

Figure 3:
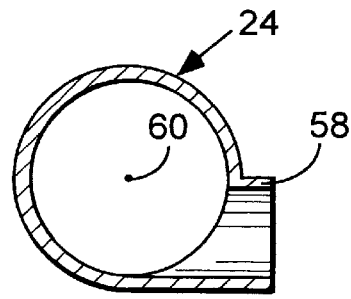
FIG. 3 is a cross-sectional representation of a portion of the pre-filtration apparatus taken along the lines 3—3 of FIG. 2.

The upper portion 52 and the lower portion 54 of the cap assembly 24 are in fluid communication. The upper portion 52 has a diameter which is less than the diameter of the lower portion 54. The vessel 14 has a fluid outlet 58 formed through the upper portion 52 of the cap assembly 24 so that the fluid outlet 58 is in fluid communication with the upper portion 52 of the cap assembly 24. As best shown in FIG. 3, the fluid outlet 58 is laterally offset from a centrally disposed, elongated axis 60 of the vessel 14 so as to create a turbulent vortex in the cap assembly 24 and the vessel 14 so as to more effectively scour and clean the positively buoyant particulate 16 during the back washing mode of operation of the pre-filtration apparatus 10.

The vessel 14 includes a strainer assembly 64 supported in a cavity 66 defined by the lower portion 54 of the cap assembly 24 so as to prevent the positively buoyant particulate 16 from exiting through the fluid outlet 58 during the normal mode of operation of the pre-filtration apparatus 10. The strainer assembly 64 is connected to a downwardly extending annular flange 68, which is connected to the lower portion 54 of the cap assembly 24. The strainer assembly 64 includes a strainer body 70 having a plurality of slots 72 formed there through. The slots 72 are in fluid communication with the fluid outlet 58 for a purpose to be described hereinafter.

During the normal mode of operation of the pre-filtration apparatus 10 (i.e. when the pre-filtration apparatus 10 functions as a vacuum container), contaminated liquid, such as contaminated water from a decorative pond, pool or aquarium, is passed sequentially through the fluid inlet 30, the bed of positively buoyant particulate 16, the slots 72 and the fluid outlet 58. The large particulate matter in the contaminated liquid accumulates in the bed of positively buoyant particulate 16 so as to filter or strain out the large particulate matter in the contaminated liquid.

During the back washing mode of operation of the pre-filtration apparatus 10 (i.e. when the pre-filtration apparatus 10 is functioning as a pressurized container to remove the accumulated large particulate matter from the bed of positively buoyant particulate 16), liquid is passed sequentially through the fluid outlet 58, the slots 72, the bed of positively buoyant particulate 16, and the back washing outlet 32. As discussed above, the lateral offset position of the fluid outlet 58 causes a vortex to form in the vessel 14 so as to turbulently agitate and separate the individual positively buoyant particulate in the bed of positively buoyant particulate 16 during the back washing mode of operation to more effectively remove the accumulated large particulate matter therefrom.

To permit liquid to be added to the pre-filtration apparatus 10 prior to operation thereof, the vessel includes a priming assembly 74 connected to the upper portion 52 of the cap assembly 24. The priming assembly 74 includes a priming tube 76 in fluid communication with the upper portion 52, and a priming cap 78 removably secured to the priming tube 76. In operation, the priming cap 78 is removed from the priming tube 76 and the liquid 18 is added through the priming tube 76 until the vessel 14, the cap assembly 24 and the priming tube 76 are filled with liquid. Thereafter, the priming cap 78 is replaced on the priming tube 76 so as to form a fluid tight seal there with, and the pre-filtration apparatus 10 can then be operated in either of the normal mode or back washing mode of operations. The priming cap 78 can be removably secured to the priming tube 76 by any suitable assembly, such as mating threads (not shown) disposed on the priming cap 78 and the priming tube 76.

The bed of positively buoyant particulate 16 contained in the vessel 14 may comprise a wide variety of materials. Positively buoyant polymeric beads are a preferred positively buoyant particulate. The beads may be solid, porous, hollow, air-filled, vacuum-filled, gas-filled, or any other bead which is positively buoyant in the liquid to be filtered. The size and shape of the positively buoyant particulate may be varied greatly as long as the bed of positively buoyant particulate 16 define a medium which is porous to liquids disposed in the vessel 14. However, the positively buoyant particulate should have dimensions such that it will neither pass through nor clog the slots 72 in the strainer assembly 64 or the fluid discharge passageway 42.

The operation of the pre-filtration apparatus 10 will be described hereinafter with reference to FIGS. 6–8.

Construction of the Main Filtration Apparatus 12

Referring now to FIG. 4, shown therein is the main filtration apparatus 12. The main filtration apparatus 12 is constructed and operated in an identical manner as the filtering apparatus 10b described in U.S. Pat. No. 5,932,092, except as discussed hereinafter. The entire content of U.S. Pat. No. 5,932,092, relating to the filtering apparatus 10b, is hereby incorporated herein by reference.

The main filtration apparatus 12 includes a vessel 100 for housing a filtering medium, such as a bed of positively buoyant particulate 102 and a bed of negatively buoyant particulate 104 in a manner identical to that described in U.S. Pat. No. 5,932,092, the content of which is incorporated herein by reference. Generally, the beds of positively and negatively buoyant particulates 102 and 104 function as filtering mediums to filter out the smaller particulate matter which was not previously filtered out by the pre-filtration apparatus 10. The vessel 100 is characterized as having an upper end 106 and a lower end 108. The main filtration apparatus 12 further includes a lower conduit assembly 110 forming a fluid inlet of the vessel 100, and an upper conduit assembly 112 forming a fluid outlet of the vessel 100.

It should be noted that the vessel 100 is similar to the vessels 12 and 12a described in U.S. Pat. No. 5,932,092 (the content of which is incorporated herein by reference), except as noted below. Thus, for the sake of brevity, a detailed discussion of such components will not be repeated herein with reference to the main filtration apparatus 12.

The lower conduit assembly 110 includes a primary conduit 114, a pair of lateral conduits 116a and 116b, and a discharge conduit 118. The primary conduit 114 has one end disposed within the vessel 100 proximate the lower end 108 thereof.

The lateral conduits 116a and 116b each have an inlet end connected to the primary conduit 114 and extend outwardly therefrom. Each lateral conduit 116a and 116b has a slotted area 122a and 122b, respectively, positioned within the bed of negatively buoyant particulate 104.

A check valve 124 is interposed between the primary conduit 114 and the lateral conduit 116a, and a check valve 126 is interposed between the primary conduit 114 and the lateral conduit 116b. The check valves 124 and 126 are directionally positioned to allow liquid to pass through the check valves 124 and 126 as liquid flows in a direction from the primary conduit 114 to the lateral conduits 116a and 116b.

The discharge conduit 118 has a main tube 128, which is connected to the primary conduit 114 so as to establish fluid communication therebetween, and a pair of branch tubes 130a and 130b. Each branch tube 130a and 130b has a slotted area 132a and 132b, respectively. The discharge conduit 118 is supported within the vessel 100 so that the slotted areas 132a and 132b are positioned between the bed of positively buoyant particulate 102 and the bed of negatively buoyant particulate 104 when the main filtration apparatus 12 is in operation. A check valve 134 is interposed between the main tube 128 of the discharge conduit 118 and the primary conduit 114. The check valve 134 is directionally positioned to allow liquid to pass through the check valve 134 as liquid flows in a direction from the discharge conduit 118 to the primary conduit 114.

The upper conduit assembly 112 includes a primary conduit 136 having one end extended into the vessel 100 proximate the upper end 106 thereof, as substantially shown in FIG. 4. The primary conduit 136 is provided with a pair of slotted areas 138a and 138b which are positioned within the bed of positively buoyant particulate 102. The slotted area 138b has a smaller area than the slotted area 138a. For example, the slotted area 138b may only be formed in the top of the primary conduit 136 so that the slotted area 138b faces upwardly, while the slotted area 138a may be formed in the top and sides of the primary conduit 136. A check valve 140 is interposed in between the slotted areas 138a and 138b. The check valve is directionally positioned to allow liquid to pass through the check valve as liquid flows in a direction from the slotted area 138a to the slotted area 138b. The check valve 140 can be a commercially available swing check valve.

A vent conduit 142 extends upwardly through the upper end 106 of the vessel 100. The vent conduit 142 is provided with a manual relief valve 144, for permitting the selective release of gaseous fluids trapped in the upper end 106 of the vessel 100.

The bed of positively buoyant particulate 102 contained in the vessel 100 may comprise a wide variety of materials. Positively buoyant polymeric beads are a preferred positively buoyant particulate. The beads may be solid, porous, hollow, air-filled, vacuum-filled, gas-filled, or any other bead which is positively buoyant in the liquid to be filtered. The size and shape of the positively buoyant particulate may be varied greatly as long as the positively buoyant particulate define a medium which is porous to a liquids disposed in the vessel 100. However, the positively buoyant particulate should have dimensions such that it will neither pass through nor clog the slots 138a and 138b in the primary conduit 136.

Typically, the quantity of positively buoyant particulate utilized is adequate to provide a bed of positively buoyant particulate for the upper ten to thirty percent of the vessel 100. Of course, the amount of positively buoyant particulate used may be increased or decreased depending on the type of liquid being filtered and the desired filtering results.

The bed of negatively buoyant particulate 104 contained in the vessel 100 may comprise a wide variety of negatively buoyant materials. Sand and gravel are preferred materials for the negatively buoyant particulate. Other materials which may be used for the negatively buoyant particulate include crushed rock, granules of charcoal or the like, stainless steel balls, stainless steel beads, metallic balls, metallic beads, glass beads, plastic beads, filled polymeric beads, glass balls, metallic balls coated with a polymeric material, metallic beads coated with a polymeric material, and polymeric beads filled with a suitable material such as calcium. The size and shape of the negatively buoyant particulate may be varied greatly as long as the negatively buoyant particulate define a medium which is porous to the liquid being filtered. However, the negatively buoyant particulate should have dimensions such that it will neither pass through nor clog the slotted area 122 in the lateral conduits 116.

Typically, the quantity of negatively buoyant particulate is adequate to provide a medium of porous material extending over the lower ten to thirty percent of the vessel 100. However, the amount of negatively buoyant particulate used may be increased or decreased depending on the type of liquid being filtered and the desired filtering results.

The dimensions and quantities of positively buoyant particulate and negatively buoyant particulate affect the filtering efficiency and the throughput of the main filtration apparatus 12. In general, small volumes of coarse particulate result in greater throughput but with fewer impurities removed from the liquid. Conversely, large quantities of fine particulate produce better filtration but reduced throughput or increased pumping requirements to push the liquid through the main filtration apparatus 12. Thus, the sizes and quantities of positively buoyant and negatively buoyant particulate should be selected according to the filtration characteristics desired.

Filtration System

Figure 5:
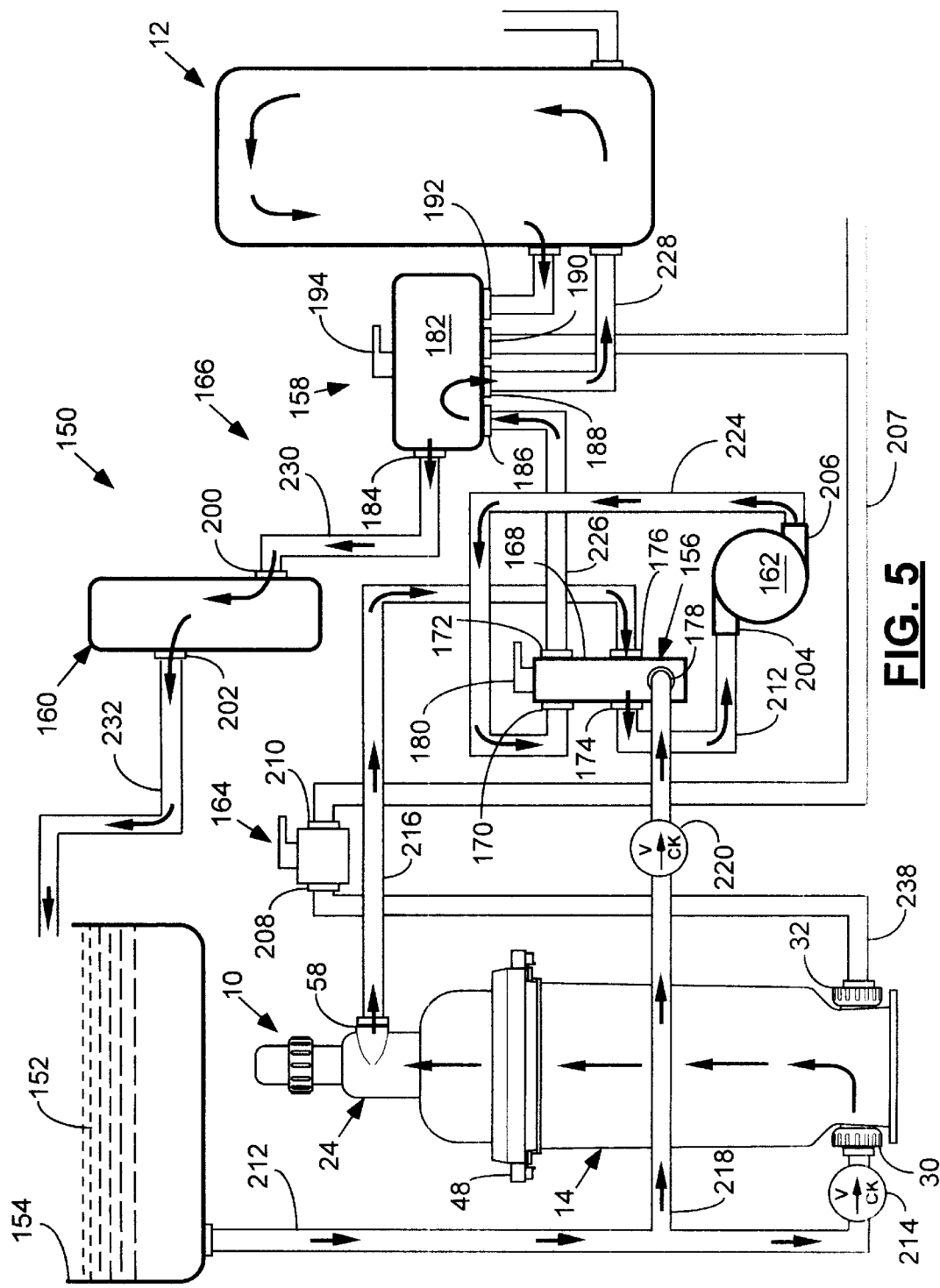
FIG. 5 is a diagrammatical representation of a filtration system constructed in accordance with the present invention wherein the pre-filtration apparatus and the main filtration apparatus are both operating in a normal mode.
Figure 6:
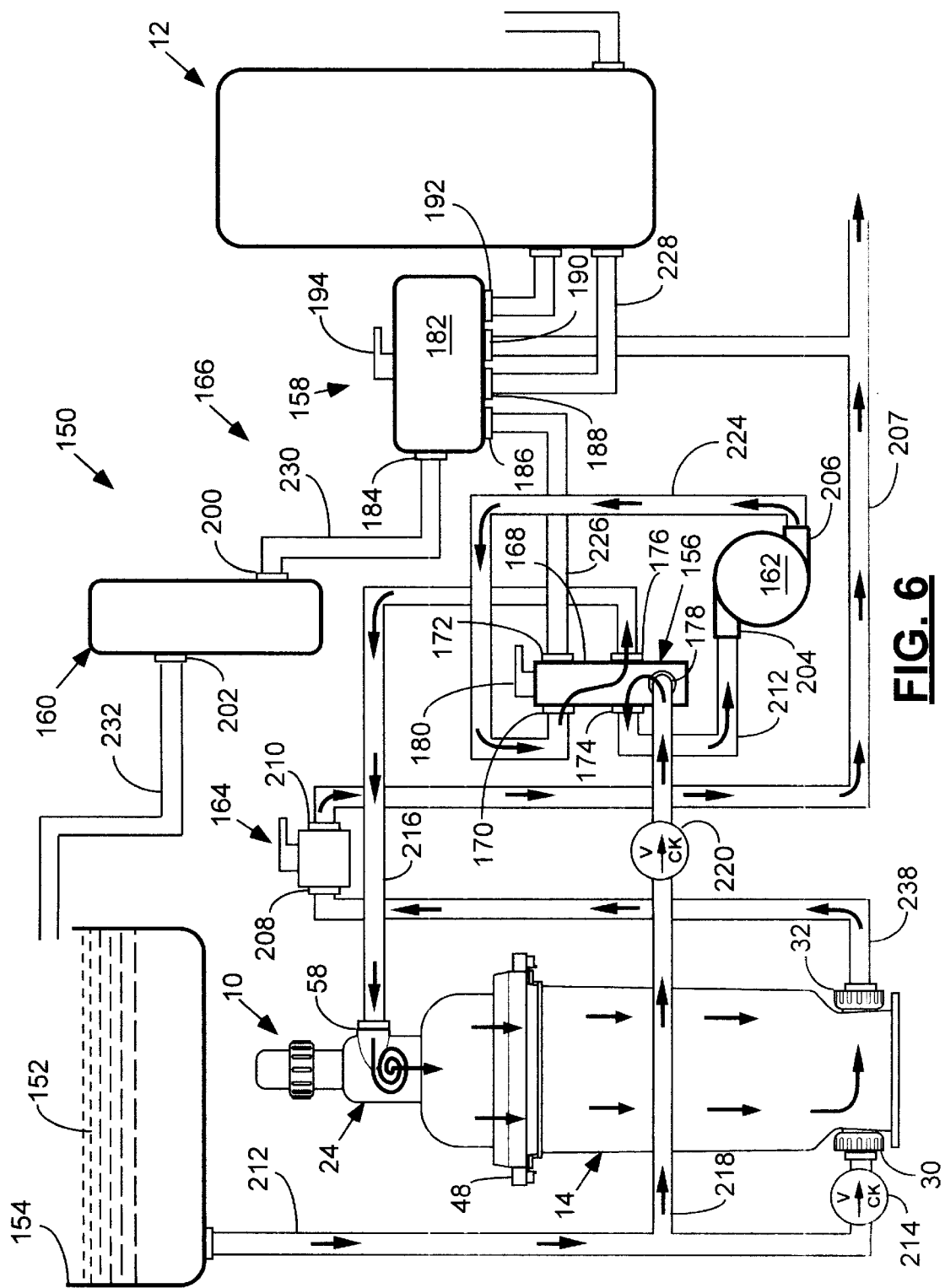
FIG. 6 is a diagrammatical representation of the filtration system depicted in FIG. 6 wherein the pre-filtration apparatus is operating in a back wash mode.
Figure 7:
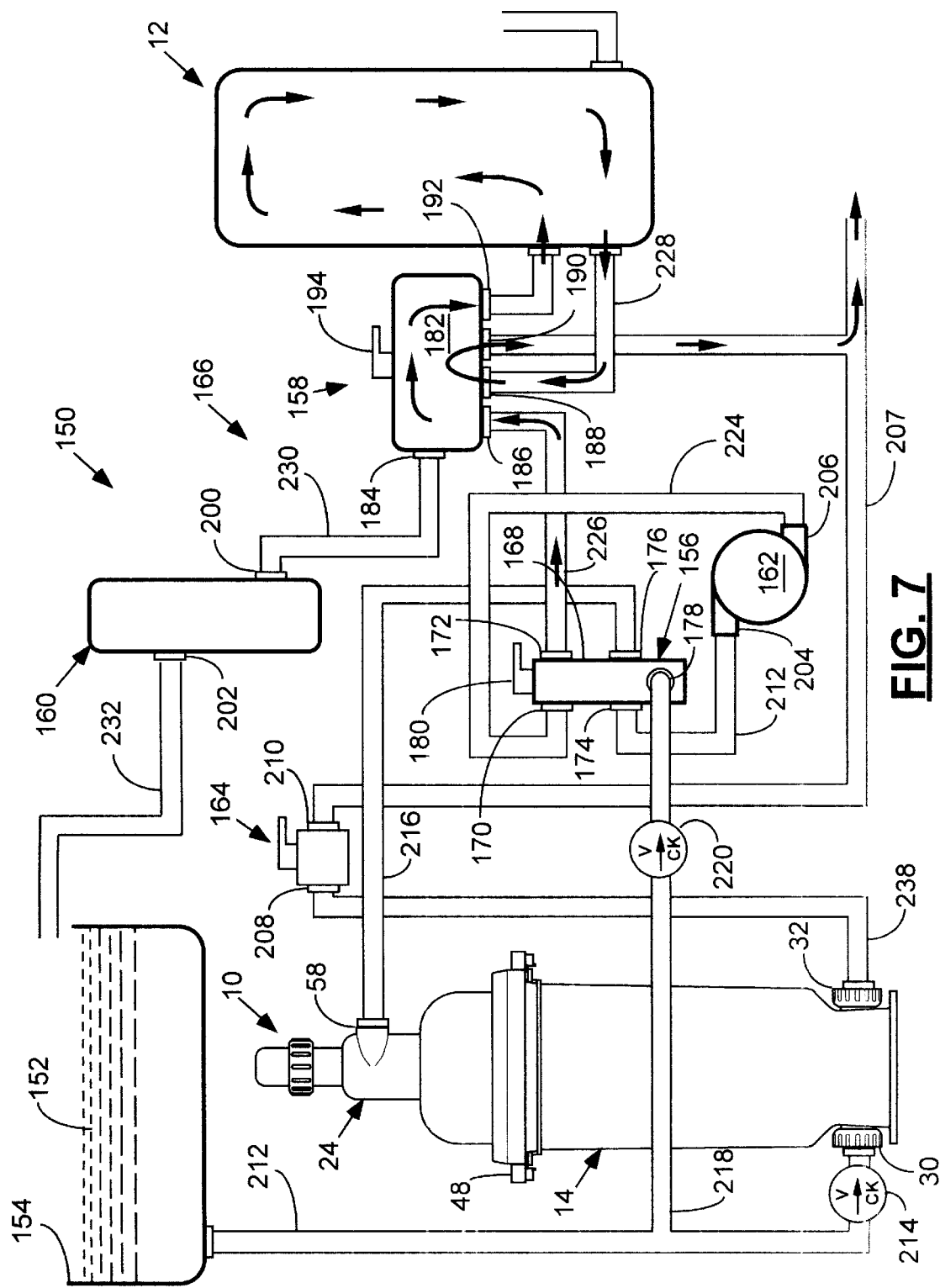
FIG. 7 is a diagrammatical representation of the filtration system depicted in FIG. 6 wherein the pre-filtration apparatus is operating in the normal mode and the main filtration apparatus is operating in a back wash mode.

Referring now to FIGS. 5–7, shown therein and designated by the reference numeral 150 is a diagrammatic representation of a filtration system constructed in accordance with the present invention for filtering liquids 152 contained in a vessel 154. The filtration system 150 includes the pre-filtration apparatus 10, and the main filtration apparatus 12 disposed downstream from the pre-filtration apparatus 10. The filtration system 150 is also provided with a pre-filter control assembly 156, a main filter control assembly 158, an ultraviolet sterilizer 160, a pump 162, a pre-filtration waste valve 164, and a conduit assembly 166.

The pre-filter control assembly 156 provides directional control of the liquids to selectively operate the pre-filtration apparatus 10 in the normal or back wash modes of operation. The pre-filter control assembly includes a valve body 168 defining a first port 170, a second port 172, a third port 174, a fourth port 176, and a fifth port 178. The pre-filter control assembly 156 also includes a valve handle 180 which is selectively movable so as to control the flow of liquids through the first, second, third, fourth and fifth ports 170–178. The pre-filter control assembly 156 can be a multi-port valve.

The main filter control assembly 158 provides directional control of the liquids to selectively operate the main filter control assembly in the normal or back wash modes of operation. The main filter control assembly 158 includes a valve body 182, a first port 184, a second port 186, a third port 188, a fourth port 190, a fifth port 192, and a valve handle 194. The valve handle 194 is selectively movable so as to control the flow of liquids through the first, second, third, fourth and fifth ports 184–192. The main filter control assembly 158 can be a commercially available multi-port valve.

The ultraviolet sterilizer 160 includes an inlet port 200 and an outlet port 202. The ultraviolet sterilizer 160 can be a commercially available ultraviolet sterilizer, which is known in the art.

The pump 162 moves the liquids 152 through the filtration system 150. The pump 162 includes a suction side 204 and a discharge side 206. The pump 162 can be a commercially available pump, which is known in the art. The size of the pump 162 can vary widely and depends on the sizes of the vessel 154, the pre-filtration apparatus 10, and the main filtration apparatus 12.

The pre-filtration waste valve 164 controls the flow of liquids 152 from the back-washing outlet 32 to a waste line 207. The pre-filtration waste valve 164 includes an inlet port 208 and an outlet port 210. The pre-filtration waste valve 164 can be a commercially available valve.

The conduit assembly 166 connects the vessel 154, pre-filtration apparatus 10, main filtration apparatus 12, pre-filter control assembly 156, main filter control assembly 158, ultraviolet sterilizer 160, the pump 162 and the pre-filtration waste valve 164 to establish fluid communication therebetween. The pre-filter control assembly 156, and the main filter control assembly 158 cooperate to provide directional control of the flow of the liquid 152 to operate the filtration system 150 in three modes of operation: a normal mode of operation (as shown in FIG. 5 with directional flow arrows), a pre-filtration apparatus back washing mode of operation (as shown in FIG. 6 with directional flow arrows), and a main filtration back washing mode of operation (as shown in FIG. 7 with directional flow arrow). A brief summary of each of these three modes of operations follows.

In the normal mode of operation, the liquid 152 is pumped from the vessel 154, and sequentially directed through the pre-filtration apparatus 10 (from the fluid inlet 30 upwardly to the fluid outlet 58), the pump 162, the main filtration apparatus 12, and the ultraviolet sterilizer 160. The filtered liquid 152 is then directed by the conduit assembly 166 back into the vessel 154. The pre-filtration apparatus 10 filters out the large particles in the liquid 152, such as pine needles and leaves, and the main filtration apparatus 12 filters out the small particles in the liquid 152, such as soil and insect larvae.

In the pre-filtration apparatus back washing mode of operation, liquid 152 is pumped from the vessel 154, and sequentially directed through the pump 162, the pre-filtration apparatus 10 (from the fluid outlet 58 downwardly to the back-washing outlet 32), and to the waste line 207. The pre-filtration apparatus back washing mode of operation removes the accumulated large particulate matter from the positively buoyant particles in the bed of positively buoyant particulate 16.

In the main filtration back washing mode of operation, liquid 152 is pumped from the vessel 154, and sequentially directed through the pre-filtration apparatus 10 (from the fluid inlet 30 upwardly to the fluid outlet 58), the pump 162, through the main filtration apparatus 12 (from the primary conduit 136 of the upper conduit assembly 112 to the slots of the slotted areas 132*b*) and discharged to the waste line 207. The main filtration back washing mode of operation removes the accumulated small particulate matter from the positively buoyant particles in the bed of positively buoyant particulate 102 while maintaining the bed of negatively buoyant particulate 104 in a relatively undisturbed state so as not to remove the bacteria growth from the surface of the particulate making up the bed of negatively buoyant particulate 104.

Referring now in particular to FIGS. 5–7, one embodiment of the conduit assembly 166, for fluidly interconnecting the pre-filtration apparatus 10, the main filtration apparatus 12, the vessel 154, the pre-filter control assembly 156, the main filter control assembly 158, the ultraviolet sterilizer 160, the pump 162, and the pre-filtration waste valve 164 will now be described.

The conduit assembly 166 includes a fluid source conduit 212. The fluid source conduit 212 has one end connected to the vessel 154 so as to establish fluid communication therewith and an opposite end connected to the fluid inlet 30 of the pre-filtration apparatus 10. A directional check valve 214 is provided adjacent to the fluid inlet 30 so as to permit the liquid 152 to flow into the vessel 14 of the pre-filtration apparatus 10.

The conduit assembly 166 also includes a pre-filter upper conduit 216. The pre-filter upper conduit 216 has one end connected to the fluid outlet 58 of the pre-filtration apparatus 10 and an opposite end connected to the fourth port 176 of the pre-filter control assembly 156 so as to establish fluid communication between the fluid outlet 58 and the fourth port 176.

The conduit assembly 166 also includes a pre-filter back wash conduit 218. The pre-filter back wash conduit 218 has one end connected to the fluid source conduit 212 and an opposite end connected to the fifth port 178 of the pre-filter control assembly 156 so as to establish fluid communication there between. A directional check valve 220 is positioned in the pre-filter back wash conduit 218 so as to permit the flow of the liquid 152 in a direction generally toward the pre-filter control assembly 156.

The conduit assembly 166 is further provided with a first pump conduit 222. The first pump conduit 222 has one end connected to the third port 174 of the pre-filter control assembly 156 and an opposite end connected to the suction side 204 of the pump 162 so as to establish fluid communication there between.

The conduit assembly 166 is also provided with a second pump conduit 224. The second pump conduit 224 has one end connected to the discharge side 206 of the pump 162, and an opposite end connected to the first port 170 of the pre-filter control assembly 156 so as to establish fluid communication there between.

The conduit assembly 166 is further provided with a pre-filter discharge conduit 226. The pre-filter discharge conduit 226 has one end connected to the second port 172 of the pre-filter control assembly 156 and an opposite end connected to the second port 186 of the main filter control assembly 158 so as to establish fluid communication there between.

The conduit assembly 166 also includes a main filter lower conduit 228. The main filter lower conduit 228 has one end connected to the third port 188 of the main filter control assembly 158 and an opposite end connected to the primary conduit 244 so as to establish fluid communication there between.

The primary conduit 136 of the main filtration apparatus 12 is connected to the fifth port 192 of the main filter control assembly 158 so as to establish fluid communication there between.

The conduit assembly 166 also includes a main filter discharge conduit 230. The main filter discharge conduit 230 has one end connected to the first port 184 of the main filter control assembly 158 and an opposite end connected to the inlet port 200 of the ultraviolet sterilizer 160 so as to establish fluid communication there between.

The conduit assembly 166 is further provided with a fluid discharge conduit 232. The fluid discharge conduit 232 has one and connected to the outlet port 202 of the ultraviolet sterilizer 160 and an opposite end positioned to discharge the liquid.

To provide a fluid flow path for the waste liquid discharged by the pre-filtration apparatus 10 during the back washing mode of operation, the conduit assembly 166 is provided with a pre-filter lower conduit 238. The pre-filter lower conduit 238 has one end connected to the back washing outlet 32 of the pre-filtration apparatus 10 and an opposite end connected to the inlet port 208 of the pre-filtration waste valve 164. It should be understood that for proper operation of the pre-filtration apparatus 10 during back washing, the pre-filtration waste valve 164 should be positioned about level with or slightly above the fluid outlet 58 formed in the cap assembly 24 of the pre-filtration apparatus 10. The waste line 207 is connected to the outlet port 210 of the pre-filtration waste valve 164 for discharge of the liquid utilized for back washing into the waste line 207.

The waste line 207 is also connected to the fourth port 190 of the main filter control assembly 158 for discharge of the liquid utilized in back washing the main filtration apparatus 12.

Normal Mode of Operation—When the Pre-Filtration Apparatus Functions as a Vacuum Container Referring now in particular to FIG. 6, the normal mode of operation of the filtration system 150 will be described in more detail. Initially, the valve handles 180 and 194 of the pre-filter control assembly 156 and the main filter control assembly 158 are manipulated so as to set the pre-filter control assembly 156 and the main filter control assembly 158 into a normal mode of operation setting. Then, the pre-filtration waste valve 164 is set so as to close the pre-filter lower conduit 238.

Once the pre-filter control assembly 156, the main filter control assembly 158 and the pre-filtration waste valve 164 are set to direct the flow of the liquid 152 through the normal mode of operation, liquid 152 can be pre-filtered through the pre-filtration apparatus 10. The pump 162 is then actuated to begin movement of the liquid 152 from the vessel 154. The liquid 152 passes from the fluid source conduit 212 and through the fluid inlet 30 of the pre-filtration apparatus 10. Then, the liquid 152 passes upwardly through the vessel 14, through the bed of positively buoyant particulate 16, to pre-filter the liquid 152 and remove the large particulate matter therefrom. The liquid 152 then passes through the slots 72 formed in the strainer body 70 and then through the fluid outlet 58 and into the pre-filter upper conduit 216.

The pre-filtered liquid 152 passing through the fluid outlet 58 is then directed into the fourth port 176 of the pre-filter control assembly 156. The pre-filtered liquid 152 then passes sequentially through the fourth port 176, the third port 174, the first pump conduit 222, the first port 204 of the pump 162, the pump 162, the second port 206 of the pump 162, the second pump conduit 224, the first and second ports 170 and 172 of the pre-filter control assembly 156 and the pre-filter discharge conduit 226. The liquid passing through the pre-filter discharge conduit 226 then passes through the second and third ports 186 and 188 of the main filter control assembly 158.

The liquid exiting the main filter control assembly 158 is then directed into the primary conduit 114. Referring again to FIG. 4, the check valve 134 is forced into a closed position, and the liquid is thereby caused to pass into the lateral conduits 116a and 116b, through the slots of the slotted areas 122a and 122b, and into the bed of negatively buoyant particulate 104. Under pressure, the liquid is forced up through the bed of negatively buoyant particulate 104 whereby the upwardly moving liquid creates a fluidized bed in which the liquid undergoes a nitrification process.

Upon passing through the bed of negatively buoyant particulate 104, the liquid travels up through the vessel 100 and through the bed of positively buoyant particulate 102. Due to the upward movement of the liquid and the positive buoyancy of the bed of positively buoyant particulate 102, the particulate which make up the bed of positively buoyant particulate 102 are compacted so as to create a filter bed which strains particulate contaminants from the liquid. The strained liquid then passes into the slots of the slotted areas 138a and 138b of the primary conduit 136 of the upper conduit assembly 112, through the primary conduit 136, and sequentially through the fifth and first ports 192 and 184 of the main filter control assembly 158 into the main filter discharge conduit 230.

The liquid is then forced through the ultraviolet sterilizer 160 via the inlet port 200 and exit port 202 thereof, and returned into the vessel 154 via the fluid discharge conduit 232.

Pre-Filtration Apparatus Back Washing Mode of Operation—When the Pre-Filtration Apparatus Functions as a Pressurized Vessel Referring now in particular to FIG. 6, the pre-filtration apparatus back washing mode of operation of the filtration system 150 will be described in more detail. Initially, the valve handle 180 of the pre-filter control assembly 156 is manipulated so as to set the pre-filter control assembly 156 into a back washing mode of operation setting wherein the fluid outlet 58 of the pre-filtration apparatus 10 communicates with the discharge side 204 of the pump 162. Then, the pre-filtration waste valve 164 is set so as to open the pre-filter lower conduit assembly 238 to permit liquid to pass through the pre-filtration waste valve 164.

Once the pre-filter control assembly 156, and the pre-filtration waste valve 164 are set to direct the flow of the liquid 152 through the pre-filtration apparatus back washing mode of operation, liquid is pumped from the vessel 154, and sequentially directed through the pump 162, and forced into the fluid outlet 58 formed in the cap assembly 24 of the pre-filtration apparatus 10. Referring to FIG. 6 in combination with FIG. 2, under pressure, the liquid is forced through the slots 72 in the strainer assembly 64 and directed downwardly into the vessel 14 and through the bed of positively buoyant particulate 16 to remove the accumulated large particulate matter therefrom. The positively buoyant particulate in the bed of positively buoyant particulate have a strong tendency to resist the flow of the liquid passing through the vessel 14, which aids in the removal of the accumulated large particulate matter therefrom. Moreover, as discussed above, the lateral offset position of the fluid outlet 58 in the cap assembly 24 causes a vortex to form in the cap assembly 24 and the vessel 14 so as to turbulently agitate and separate the individual positively buoyant particulate in the bed of positively buoyant particulate 16 to even more effectively remove the accumulated large particulate matter therefrom.

The check valve 214 prevents the liquid from passing through the fluid inlet 30. Thus, the liquid passing through the bed of positively buoyant particulate 16 (and large particulate matter removed from the bed of positively buoyant particulate 16) is then directed (under pressure) through the fluid discharge passageway defined in between the annular lip 38 and the vessel 14 and passed sequentially through the back-washing outlet 32, the pre-filter lower conduit 238, the pre-filtration waste valve 164 and into the waste line 207.

Main Filtration Back Washing Mode of Operation

Referring now in particular to FIG. 7, the main filtration back washing mode of operation of the filtration system 150 will be described in more detail. Initially, the valve handles 180 and 194 of the pre-filter control assembly 156 and the main filter control assembly 158 are manipulated so as to set the pre-filter control assembly 156 into the normal mode of operation setting and the main filter control assembly 158 into a back washing mode of operation setting. Then, the pre-filtration waste valve 164 is set so as to close off the pre-filter lower conduit assembly 238.

Once the pre-filter control assembly 156, the main filter control assembly 158 and the pre-filtration waste valve 164 are set to the main filtration back washing mode of operation, liquid 152 is pumped from the vessel 154, and sequentially directed through the pre-filtration apparatus 10 (from the fluid inlet 30 upwardly to the fluid outlet 58), the pump 162, the pre-filter control assembly 156 as discussed above with reference to FIG. 6, and into the pre-filter discharge conduit 226.

Under pressure, the liquid is then forced into the primary conduit 136 via the second and fifth ports 184 and 192 of the main filter control assembly 158. The liquid is forced through the primary conduit 136 and through the slots of the slotted areas 138b. It should be noted that the check valve 140 prevents the liquid from traveling through the slotted areas 136a, thereby enhancing the pressure of the liquid passing through the slots of the slotted area 136b, as compared to the liquid passing through the slotted area 272b in the back washing mode of the filtering apparatus 10b described in U.S. Pat. No. 5,932,092. The liquid passes down through the bed of positively buoyant particulate 102 thereby flushing the particulate contaminants from the bed of positively buoyant particulate 102.

Upon passing through the bed of positively buoyant particulate 102, the liquid takes the path of least resistance and thus passes into the slots of the slotted areas 132a and 132b of the discharge conduit 118. It will be appreciated that because the slotted areas 132a and 132b are positioned below the bed of positively buoyant particulate 102 and above the bed of negatively buoyant particulate 104, the back washing liquid is circulated through the vessel 100 so as to flush or rinse the bed of positively buoyant particulate 102 while maintaining the bed of negatively buoyant particulate 104 in a relatively undisturbed state so as not to remove the bacteria growth from the surface of the particulate making up the bed of negatively buoyant particulate 104.

Upon entering the discharge conduit 118, the liquid passes through the check valve 134, through the primary conduit 114, and through the main filter control assembly 158 (via the fifth port 192 and the fourth port 190) and into the waste line 207.

The initiation of the pre-filtration apparatus back washing mode of operation, and/or the initiation of the main filtration back washing mode of operation may be triggered (1) by pressure differential between pressure sensors arranged to determine whether the pre-filtration apparatus 10 and/or the main filtration apparatus 12 are becoming clogged with particulate contaminants, (2) at a preset time interval, or (3) by manual operation of the pre-filtration waste valvel 164, and the valve handles 180, and 194 of the pre-filter control assembly 156 and the main filter control assembly 158.

Conversely, a return to the normal mode of operation may be initiated (1) by a drop in the differential pressure between pressure sensors arranged to determine whether the pre-filtration apparatus 10 and/or the main filtration apparatus 12 are becoming unclogged, (2) by a preset time interval, or (3) by manual operation of the pre-filtration waste valve 164, and the valve handles 180, and 194 of the pre-filter control assembly 156 and the main filter control assembly 158. For example, a suitable system for automatically determining the differential pressure across a filter apparatus is disclosed in U.S. Pat. No. 5,932,092, which content is hereby incorporated herein by reference.

Changes may be made in the combinations, operations and arrangements of the various parts and elements described herein without departing from the spirit and scope of the invention as defined in the following claims.

What is claimed is:

1. A filtration system for filtering particulate matter from a liquid, the filtration system comprising:
    a pre-filtration apparatus comprising:
        a vessel having a fluid inlet, a fluid outlet, and a back-washing outlet; and
        a filtering medium disposed in the vessel and capable of filtering large particulate matter from the liquid and passing fine particulate matter, the fluid inlet and the fluid outlet positioned such that liquid flowing therebetween is passed through the filtering medium, and the fluid outlet and back-washing outlet positioned such that liquid flowing therebetween is passed through the filtering medium;
    a main filtration apparatus comprising:
        a vessel having a fluid inlet and a fluid outlet; and
        a filtering medium disposed in the vessel and capable of filtering fine particulate matter from the liquid, the fluid inlet and the fluid outlet positioned such that liquid flowing therebetween is passed through the filtering medium;
    a pump fluidly connected between the pre-filtration apparatus and the main filtration apparatus, the pump having a suction side and a discharge side; and
    a pre-filter control assembly fluidly connected between the pre-filtration apparatus and the pump, the pre-filter control assembly having a normal operation setting wherein the fluid outlet of the pre-filtration apparatus is fluidly connected to the suction side of the pump to draw liquid sequentially through the fluid inlet of the pre-filtration apparatus, and the filtering medium of the pre-filtration apparatus, whereby the pre-filtration apparatus functions as a vacuum container, and a back wash operation setting wherein the fluid outlet of the pre-filtration apparatus is fluidly connected to the discharge side of the pump to force liquid sequentially through the fluid outlet of the pre-filtration apparatus, the filtering medium of the pre-filtration apparatus, and the fluid outlet of the pre-filtration apparatus whereby the pre-filtration apparatus functions as a pressurized vessel.

2. A filtration system as defined in claim 1, wherein the filtering medium of the pre-filtration apparatus is further defined as a bed of positively buoyant particulate occupying a volume of between about 30% to about 50% of the volume of the vessel.

3. A filtration system as defined in claim 1, wherein the fluid outlet of the pre-filtration apparatus is offset laterally from an elongated axis of the vessel so as to cause a vortex to form in the vessel when the pre-filter control assembly is set in the back wash operation setting and the liquid is forced through the fluid outlet by the pump.

4. A filtration system as defined in claim 1, wherein the vessel of the main filtration apparatus is further defined as having an upper end and a lower end, and the main filtration apparatus further comprises:
    a bed of negatively buoyant particulate positioned in the lower end of the vessel;
    a bed of positively buoyant particulate suspendable in the upper end of the vessel in a spaced apart relationship from the bed of negatively buoyant particulate;
    means for introducing contaminated liquid into the lower end of the vessel in a filtering mode wherein the contaminated liquid is caused to pass through the bed of negatively buoyant particulate and through the bed of positively buoyant particulate to produce a filtered liquid;
    means for discharging the filtered liquid from the vessel in the filtering mode;
    means for introducing a back wash liquid into the vessel in a back wash mode wherein the back wash liquid is passed through the bed of positively buoyant particulate to flush particulate contaminants therefrom; and
    means for discharging the back wash liquid from the vessel at a location between the bed of negatively buoyant particulate and the bed of positively buoyant particulate.

5. A filtration system as defined in claim 4, wherein the bed of negatively buoyant particulate of the main filtration apparatus occupies a volume of about ten to thirty percent of the vessel and wherein the bed of positively buoyant particulate of the main filtration apparatus occupies a volume of about ten to thirty percent of the vessel.

6. A filtration system as defined in claim 4, wherein the means for introducing the contaminated liquid into the vessel comprises:
    a primary conduit extending into the vessel; and
    a pair of laterally extending conduits connected to the primary conduit so as to establish fluid communication therewith in the filtering mode, each laterally extending conduit having a slotted area positioned within the bed of negatively buoyant particulate.

7. A filtration system as defined in claim 6, wherein the means for discharging the back wash liquid from the vessel comprises:
    a discharge conduit connected to the primary conduit so as to establish fluid communication therewith in the back wash mode, the conduit having a slotted area positioned between the bed of negatively buoyant particulate and the bed of positively buoyant particulate.

8. A pre-filtration apparatus, comprising:
    a vessel having a fluid inlet, a fluid outlet, and a back-washing outlet, the fluid outlet being offset laterally from a centrally disposed elongated axis of the vessel; and
    a filtering medium comprised of a bed of positively buoyant particulate and disposed in the vessel and capable of filtering large particulate matter from the liquid and passing fine particulate matter, the fluid inlet and the fluid outlet positioned such that liquid flowing therebetween is passed through the filtering medium, and the fluid outlet and back-washing outlet positioned such that liquid flowing therebetween is passed through the filtering medium whereby when liquid is forced through the fluid outlet and into the vessel, a vortex is formed to back wash the filtering medium.

9. A pre-filtration apparatus as defined in claim 8, wherein the vessel has a medial portion, and wherein the vessel further comprises a cap assembly positioned on the medial portion of the vessel and removably connected thereto so as to form a fluid tight relationship between the cap assembly and the medial portion of the vessel, the fluid outlet being formed through a portion of the cap assembly.

10. A pre-filtration apparatus as defined in claim 8, wherein the vessel has a lower end and the back-washing outlet is formed in the lower end of the vessel, and wherein the vessel further comprises means for preventing the positively buoyant particulate in the bed of positively buoyant particulate from passing through the back-washing outlet as liquid is passed from the fluid outlet to the back-washing outlet.

* * * * *